(12) United States Patent
Zhu

(10) Patent No.: US 9,795,170 B1
(45) Date of Patent: Oct. 24, 2017

(54) E-LIQUID SEPARATION MECHANISM AND ELECTRONIC CIGARETTE HAVING THE SAME

(71) Applicant: Xiaochun Zhu, Shenzhen (CN)

(72) Inventor: Xiaochun Zhu, Shenzhen (CN)

( * ) Notice: Subject to any disclaimer, the term of this patent is extended or adjusted under 35 U.S.C. 154(b) by 0 days.

(21) Appl. No.: 15/230,452

(22) Filed: Aug. 7, 2016

(51) Int. Cl.
*A24F 47/00* (2006.01)
*F16K 3/02* (2006.01)

(52) U.S. Cl.
CPC .......... *A24F 47/008* (2013.01); *F16K 3/0281* (2013.01)

(58) Field of Classification Search
CPC .............................. A24F 47/008; F16K 3/0281
USPC ....................................................... 131/328
See application file for complete search history.

(56) References Cited

U.S. PATENT DOCUMENTS

| 2013/0081642 | A1* | 4/2013 | Safari | A24F 47/008 |
| | | | | 131/329 |
| 2015/0027475 | A1* | 1/2015 | Jarriault | A24D 3/048 |
| | | | | 131/329 |
| 2015/0272218 | A1* | 10/2015 | Chen | H05B 3/44 |
| | | | | 131/329 |

* cited by examiner

*Primary Examiner* — Harshad C Patel

(57) ABSTRACT

The present disclosure relates to an E-liquid separation mechanism and an electronic cigarette having the E-liquid separation mechanism. In certain embodiments, the electronic cigarette may include an electronic cigarette body, a vaporizer, and an E-liquid separation mechanism. E-liquid separation mechanism includes a connecting base defining a first and a second connecting base E-liquid openings, a separator base defining a first and a second separator base E-liquid openings, a first separator block, and a second separator block. When first separator block is in a lower position, a first E-liquid supply path is formed to supply E-liquid from the E-liquid storage tank to the vaporizer. When second separator block is in a lower position, a second E-liquid supply path is formed. When first separator block is in an upper position, first E-liquid supply path is blocked. When second separator block is in an upper position, the second E-liquid supply path is blocked.

20 Claims, 6 Drawing Sheets

E-LIQUID SEPARATION MECHANISM AND ELECTRONIC CIGARETTE HAVING THE SAME

FIELD

The present disclosure generally relates to the field of electronic cigarette, and more particularly to an E-liquid separation mechanism and electronic cigarettes having the E-liquid separation mechanism.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

It is well known that smoking cigarette is harmful to smoker's health. The active ingredient in a cigarette is mainly nicotine. During smoking, nicotine, along with tar aerosol droplets produced in the cigarette burning, are breathed into the alveolus and absorbed quickly by the smoker. Once nicotine is absorbed into the blood of the smoker, nicotine then produces its effect on the receptors of the smoker's central nervous system, causing the smoker relax and enjoy an inebriety similar to that produced by an exhilarant.

The electronic cigarette is sometimes referred as electronic vaporing device, personal vaporizer (PV), or electronic nicotine delivery system (ENDS). It is a battery-powered device which simulates tobacco smoking. It generally uses a heating element that vaporizes a liquid solution (e-liquid). Some solutions contain a mixture of nicotine and a variety of flavorings, while others release a flavored vapor without nicotine. Many are designed to simulate smoking experience, such as cigarette smoking or cigar smoking. Some of them are made with similar appearance, while others are made considerably different in appearance.

When E-liquid is filled in an electronic cigarette before shipment out of a factory, the E-liquid is always in contact with an E-liquid storage medium, and exposed to air causing vaporization. The oxidation of the E-liquid may cause certain bad smell or bad taste with users. Therefore, it is desirable to separate the E-liquid from the E-liquid storage medium before users are ready to use them.

Therefore, an unaddressed need exists in the art to address the aforementioned deficiencies and inadequacies.

SUMMARY

In one aspect, the present disclosure relates to an electronic cigarette. In certain embodiments, the electronic cigarette includes: an electronic cigarette body, a vaporizer, and an E-liquid separation mechanism. The electronic cigarette body may include an E-liquid storage tank, a mouthpiece positioned on a top end of the E-liquid storage tank, and a vaporizer base positioned at a bottom end of the E-liquid storage tank. The vaporizer is positioned on the vaporizer base. The vaporizer includes a heating element, and a cylindrical E-liquid medium. The E-liquid separation mechanism includes a connecting base defining a first connecting base E-liquid opening, and an opposite second connecting base E-liquid opening, a separator base defining a first separator base E-liquid opening, and an opposite second separator base E-liquid opening, a first separator panel, and a second separator panel.

In certain embodiments, the first connecting base E-liquid opening coincides with the first separator base E-liquid opening to form a first E-liquid supply path from the E-liquid storage tank to the cylindrical E-liquid medium. The second connecting base E-liquid opening coincides with the second separator base E-liquid opening to form a second E-liquid supply path from the E-liquid storage tank to the cylindrical E-liquid medium. The first separator panel is positioned between the first connecting base E-liquid opening and the first separator base E-liquid opening. The second separator panel is positioned between the second connecting base E-liquid opening and the second separator base E-liquid opening. When the first separator panel is in an upper position, the first E-liquid supply path is blocked. When the second separator panel is in an upper position, the second E-liquid supply path is blocked. When the first separator panel is in lower position, the first E-liquid supply path is opened. When the second separator panel is in a lower position, the second E-liquid supply path is opened.

In another aspect, the present disclosure relates to an electronic cigarette. In certain embodiments, the electronic cigarette includes: an electronic cigarette body, a vaporizer, and an E-liquid separation mechanism. The electronic cigarette body may include an E-liquid storage tank, a mouthpiece positioned on a top end of the E-liquid storage tank, and a vaporizer base positioned at a bottom end of the E-liquid storage tank. The vaporizer is positioned on the vaporizer base. The vaporizer includes a heating element, and a cylindrical E-liquid medium. The E-liquid separation mechanism includes a connecting base defining a first connecting base E-liquid opening, and an opposite second connecting base E-liquid opening, a first separator block, and a second separator block.

In certain embodiments, when the first separator block is in a lower position, a first E-liquid supply path is formed to supply E-liquid from the E-liquid storage tank to the cylindrical E-liquid medium through the first connecting base E-liquid opening. When the second separator block is in a lower position, a second E-liquid supply path is formed to supply E-liquid from the E-liquid storage tank to the cylindrical E-liquid medium through the second connecting base E-liquid opening. When the first separator block is in an upper position, the first E-liquid supply path is blocked. When the second separator block is in an upper position, the second E-liquid supply path is blocked.

The present disclosure also relates to a method of using the electronic cigarette. In certain embodiments, the method includes: pulling down the first separator block or first separator panel to supply the E-liquid from the E-liquid storage tank to the cylindrical E-liquid medium through the first E-liquid supply path, and connecting the positive terminal and the negative terminal of the electrical power supply to the electronic cigarette to enjoy electronic cigarette smoking. When a user desires to increase an amount of E-liquid vapor, the user may pull down the second separator block or second separator panel to double the E-liquid supply from the E-liquid storage tank to the cylindrical E-liquid medium through the second E-liquid supply path to double the amount of E-liquid supply to the vaporizer.

These and other aspects of the present disclosure will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the disclosure and, together with the written description, serve to explain the principles of the disclosure. Wherever possible, the same reference numbers are used throughout the drawings to refer to the same or like elements of an embodiment. The drawings do not limit the present disclosure to the specific embodiments disclosed and described herein. The drawings are not necessarily to scale, emphasis instead being placed upon clearly illustrating the principles of the disclosure, and wherein.

DETAILED DESCRIPTION

Figure 1:
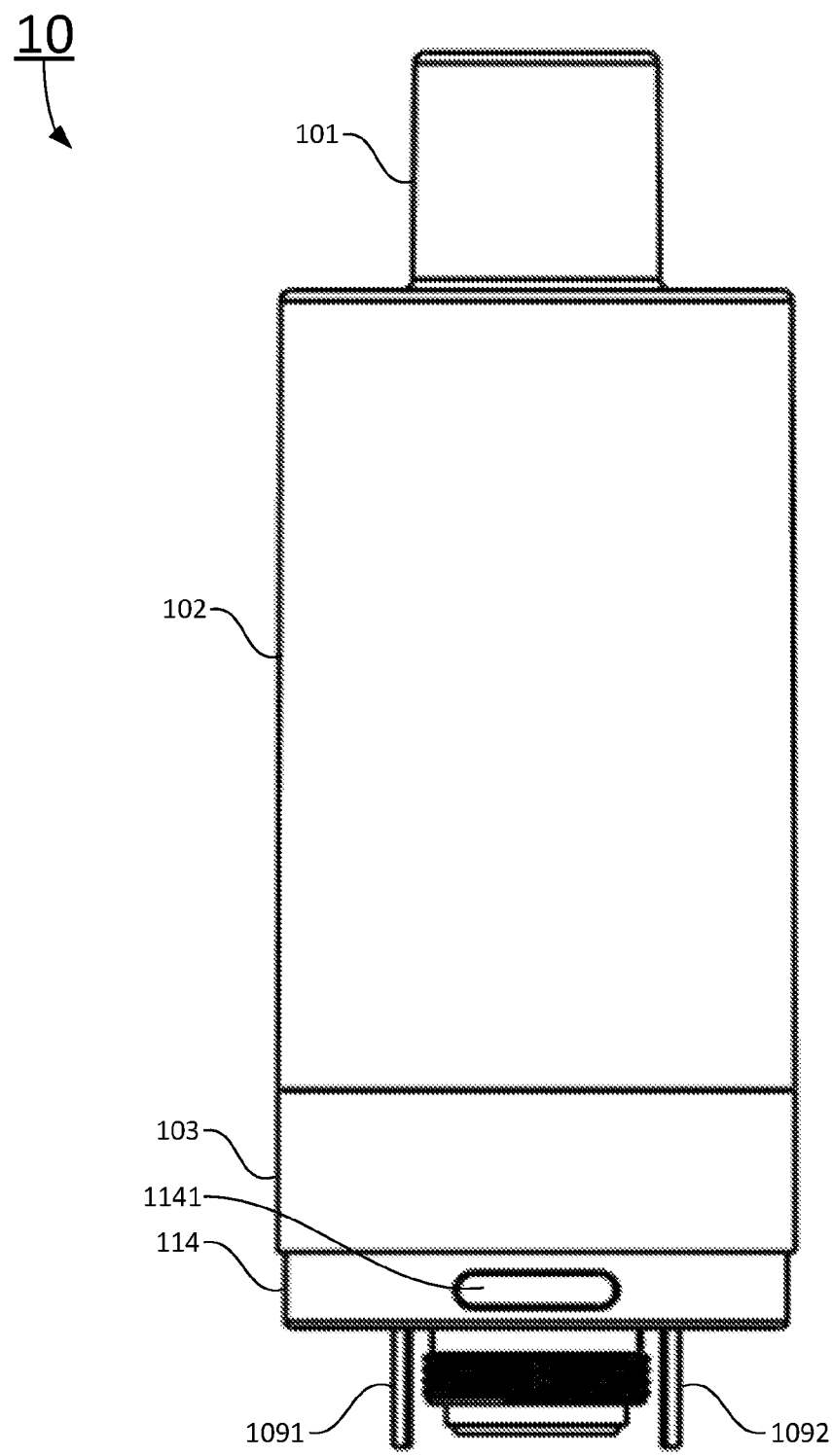
FIG. 1 is an external view of an exemplary electronic cigarette having an E-liquid separation mechanism according to certain embodiments of the present disclosure.

The present disclosure will now be described more fully hereinafter with reference to the accompanying drawings, in which exemplary embodiments of the disclosure are shown. This disclosure may, however, be embodied in many different forms and should not be construed as limited to the embodiments set forth herein. Rather, these embodiments are provided so that this disclosure will be thorough and complete, and will fully convey the scope of the disclosure to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," or "includes" and/or "including" or "has" and/or "having" when used herein, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom", "upper" or "top," and "front" or "back" may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about" or "approximately" shall generally mean within 20 percent, preferably within 10 percent, and more preferably within 5 percent of a given value or range. Numerical quantities given herein are approximates, meaning that the term "around", "about" or "approximately" can be inferred if not expressly stated.

Many specific details are provided in the following descriptions to make the present disclosure be fully understood, but the present disclosure may also be implemented by using other manners different from those described herein, so that the present disclosure is not limited by the specific embodiments disclosed in the following.

The description will be made as to the embodiments of the present disclosure in conjunction with the accompanying drawings FIGS. 1 through 4.

Referring now to FIG. 1, an external view of an exemplary electronic cigarette 10 having an E-liquid separation mechanism is shown according to certain embodiments of the present disclosure. In certain embodiments, the electronic cigarette 10 includes an electronic cigarette body 150. From the top, the electronic cigarette body 150 includes a mouthpiece 101. In the middle, the electronic cigarette body 150 includes an E-liquid storage tank 102. At the bottom, the electronic cigarette body 150 includes a vaporizer base 114. A first separator panel 1091 and a second separator panel 1092 are installed through two corresponding openings on the vaporizer base 114. In certain embodiments, the vaporizer base 114 may include one or more vaporizer air intakes 1141.

Figure 2:
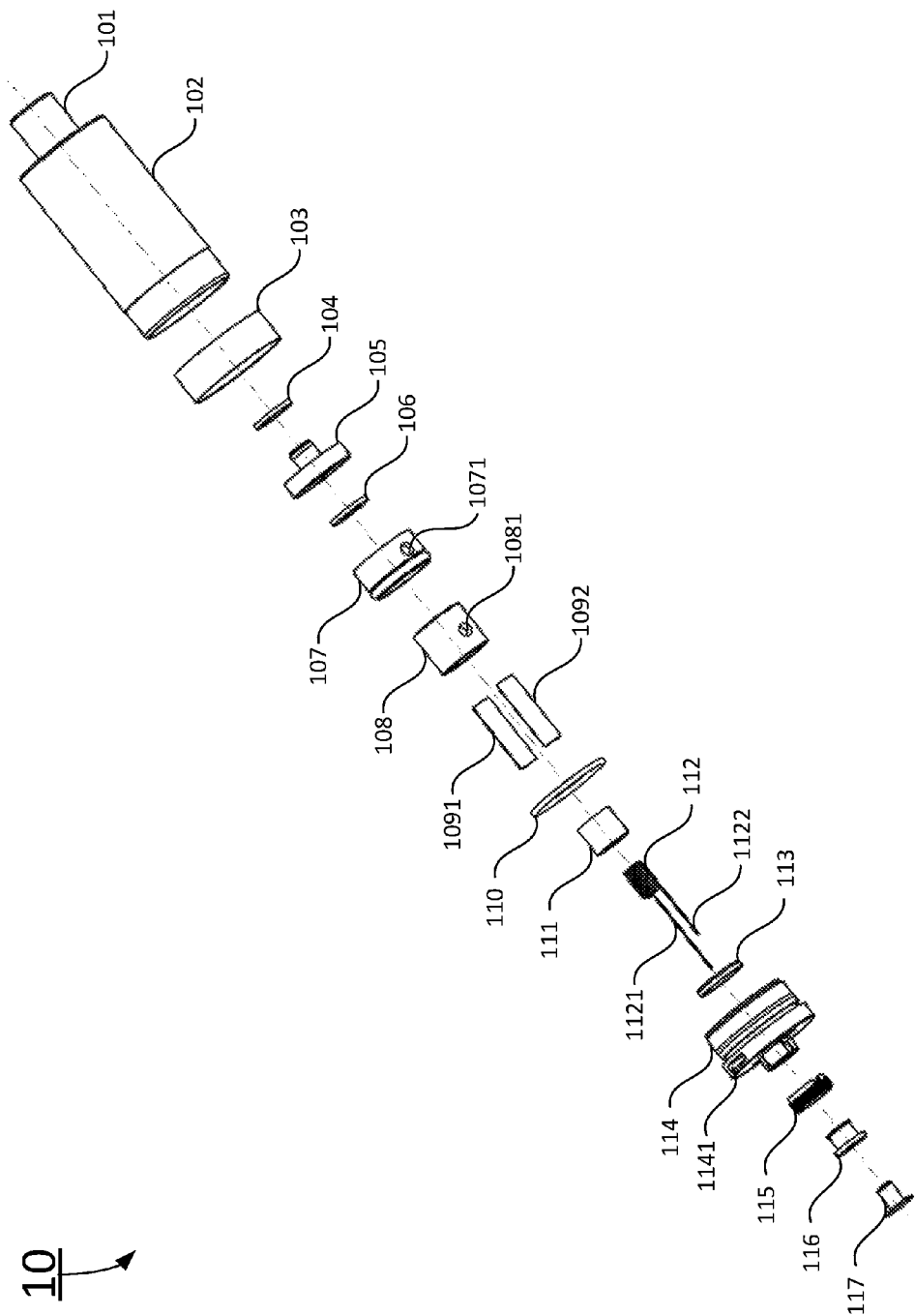
FIG. 2 is an exploded perspective view of the electronic cigarette having the E-liquid separation mechanism according to certain embodiments of the present disclosure.

Referring now to FIG. 2, an exploded perspective view of the electronic cigarette 10 having the E-liquid separation mechanism is shown according to certain embodiments of the present disclosure.

In certain embodiments, the electronic cigarette 10 includes: the electronic cigarette body 150 as shown in FIG. 1, a vaporizer 120, and an E-liquid separation mechanism 130.

The electronic cigarette body 150 includes the E-liquid storage tank 102, the mouthpiece 101 positioned on a top end of the E-liquid storage tank 102, and a vaporizer base 114 positioned at a bottom end of the E-liquid storage tank 102.

The vaporizer 120 is positioned on the vaporizer base 114. The vaporizer 120 includes at least a heating element 112, and a cylindrical E-liquid medium 111.

The E-liquid separation mechanism 130 includes a connecting base 108, a separator base 107, and a pair of separator panels 109. The connecting base 108 defines a first connecting base E-liquid opening 1081, and an opposite second connecting base E-liquid opening 1082. The separator base 107 defines a first separator base E-liquid opening 1071, and an opposite second separator base E-liquid opening 1077. The pair of separator panels 109 includes a first separator panel 1091, and a second separator panel 1092.

In certain embodiments, the cylindrical E-liquid medium 111 is installed outside of the heating element 112. The cylindrical E-liquid medium 111 may include: cotton fibers, polypropylene fibers, terylene fibers, nylon fibers, and porous ceramic materials.

In certain embodiments, the heating element 112 include a positive terminal 1121 electrically coupled to a positive terminal of an electrical power supply through a positive terminal 117 on the vaporizer base 114, and a negative terminal 1122 electrically coupled to a negative terminal of the electrical power supply through a negative terminal 115 on the vaporizer base 114.

In certain embodiments, the heating element 112 includes a grid shaped heating element, a mesh shaped heating element, a net shaped heating element, a spiral heating element, and any combination of these heating elements.

In certain embodiments, the E-liquid storage tank 102 is formed between an outside cylinder 1021 and an inside cylinder 1022 and configured to store E-liquid and supply E-liquid to the vaporizer 120. The inside cylinder 1022 forms an E-liquid vapor outlet from the vaporizer 120 to the mouthpiece 101. The vaporizer base 114 includes one or more vaporizer air intakes 1141 and the one or more vaporizer air intakes 1141 are configured to allow outside air to enter the vaporizer 120 to generate vapor. The one or more vaporizer air intakes 1141, a space inside the vaporizer 120, and the inside cylinder 1022 of the E-liquid storage tank 102 form an air flow path for the electronic cigarette 10.

In certain embodiments, the vaporizer 120 is positioned between a vaporizer cover 105 and the vaporizer base 114, and a cylindrical wall of the vaporizer base 114 and the vaporizer 120 forms a path for the E-liquid in the E-liquid storage tank 102 to enter the first E-liquid supply path and the second E-liquid supply path and to supply the E-liquid to the cylindrical E-liquid medium 111 to be vaporized by the heating element 112.

The electronic cigarette 10 may also include a vaporizer cover 105. The vaporizer cover 105 has a large cylindrical external wall at the bottom to cover the vaporizer 120, and has a small cylindrical internal wall at the top to form an E-liquid vapor path from the vaporizer 120 to the mouthpiece 101. A first sealing ring 104 is placed between the bottom of the E-liquid storage tank 102 and the vaporizer cover 105 to prevent the E-liquid in the E-liquid storage tank 102 from leaking out. A second sealing ring 106 is placed between the bottom of the vaporizer cover 105 and the vaporizer 120 to prevent the E-liquid vapor generated in the vaporizer 120 from leaking out of the liquid storage tank 102 from leaking out.

The vaporizer base 114 is slidedly inserted into the bottom end of the E-liquid storage tank 102, and sealed by a third sealing ring 110. After the vaporizer base 114 is slidedly inserted into the bottom end of the E-liquid storage tank 102, a cylindrical ring 103 may be slidedly installed outside of the bottom end of the E-liquid storage tank 102 to secure the connection and seal of the E-liquid storage tank 102 and the vaporizer base 114. A fourth sealing ring 113 is installed between the vaporizer 120 and the vaporizer base 114.

The vaporizer base 114 also includes an electric connecting ring 115, a positive terminal 117, and an insolation ring 116. The electric connecting ring 115 is electrically coupled to a negative terminal of an electric power supply. The positive terminal 117 is electrically coupled to a positive terminal of the electric power supply. The insulation ring 116 is positioned between the positive terminal 117 and the negative terminal 115 to insulate the positive terminal 117 and the negative terminal 115.

The present disclosure also relates to a method of using the electronic cigarette 10. In certain embodiments, the method of using the electronic cigarette 10 may include: pulling down, by a user, the first separator panel 1091 to supply the E-liquid from the E-liquid storage tank 102 to the cylindrical E-liquid medium 111 through the first E-liquid supply path, and connecting the positive terminal and the negative terminal of the electrical power supply to the electronic cigarette 10 to enjoy electronic cigarette smoking. In certain embodiments, when the user desires to increase an amount of E-liquid vapor, the user may pull down the second separator panel 1092 to double the E-liquid supply from the E-liquid storage tank 102 to the cylindrical E-liquid medium 111 through the second E-liquid supply path to double the amount of E-liquid supply to the vaporizer 120.

Figure 3A:
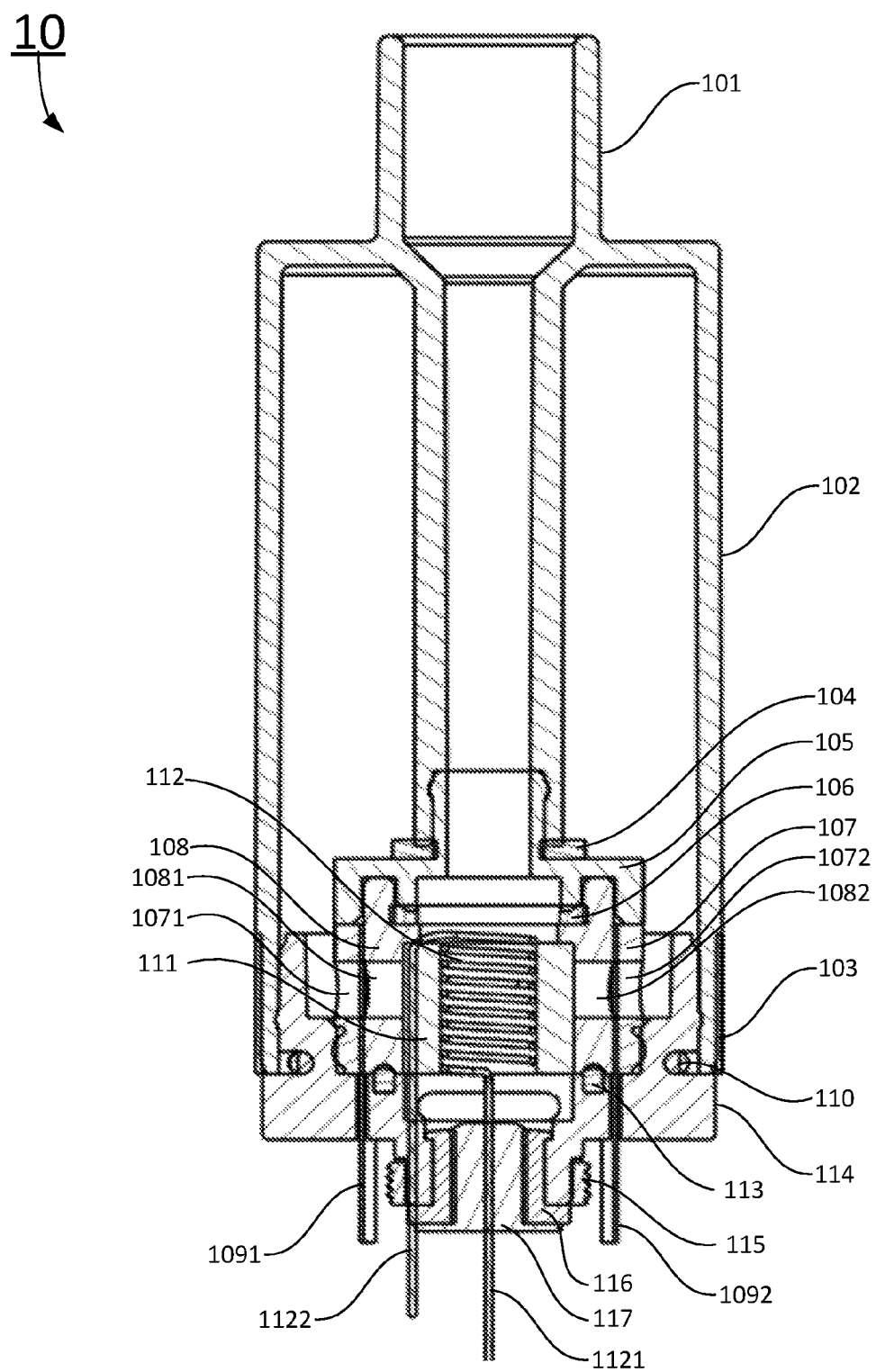
FIG. 3A is a detailed cross-sectional view of the electronic cigarette having the E-liquid separation mechanism when two separator panels are in an upper position and E-liquid supply paths are blocked.
Figure 3B:
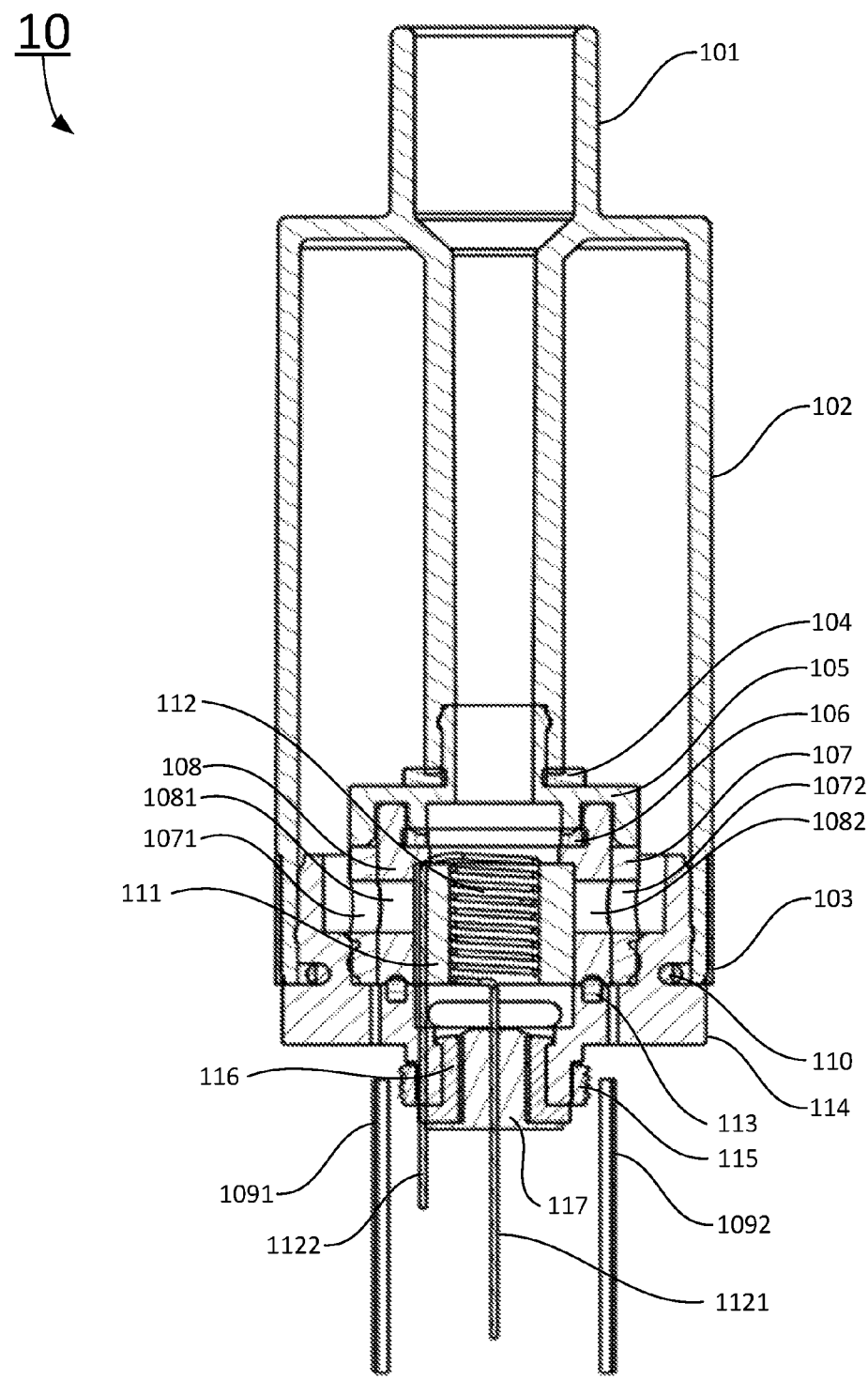
FIG. 3B is a detailed cross-sectional view of the electronic cigarette having the E-liquid separation mechanism when two separator panels are pulled to a lower position and the E-liquid supply paths are opened according to certain embodiments of the present disclosure.

FIG. 3A is a detailed cross-sectional view of the electronic cigarette 10 having the E-liquid separation mechanism when the two separator panels are in an upper position and E-liquid supply paths are blocked, and FIG. 3B is a detailed cross-sectional view of the electronic cigarette having the E-liquid separation mechanism when the two separator panels are pulled to a lower position and the E-liquid supply paths are opened, according to certain embodiments of the present disclosure.

In certain embodiments, the first connecting base E-liquid opening 1081 coincides with the first separator base E-liquid opening 1071 to form a first E-liquid supply path from the E-liquid storage tank 102 to the cylindrical E-liquid medium 111. The second connecting base E-liquid opening 1082 coincides with the second separator base E-liquid opening 1072 to form a second E-liquid supply path from the E-liquid storage tank 102 to the cylindrical E-liquid medium 111. The first separator panel 1091 is positioned between the first connecting base E-liquid opening 1081 and the first separator base E-liquid opening 1071. The second separator panel 1092 is positioned between the second connecting base E-liquid opening 1082 and the second separator base E-liquid opening 1072.

When the first separator panel 1091 is in an upper position as shown in FIG. 3A, the first E-liquid supply path is blocked. When the second separator panel 1092 is in an upper position as shown in FIG. 3A, the second E-liquid supply path is blocked. When the first separator panel 1091 is pulled down to a lower position as shown in FIG. 3B, the first E-liquid supply path is opened. When the second separator panel 1092 is pulled down to a lower position as shown in FIG. 3B, the second E-liquid supply path is opened. The one or both E-liquid supply paths are opened, the E-liquid from the E-liquid storage tank 102 may be directed to the cylindrical E-liquid storage medium 111 to be vaporized by the vaporizer 120. The first separator panel 1091 and the second separator panel 1092 may be operated separately and independently to adjust the E-liquid vapor generated for the user.

Figure 4A:
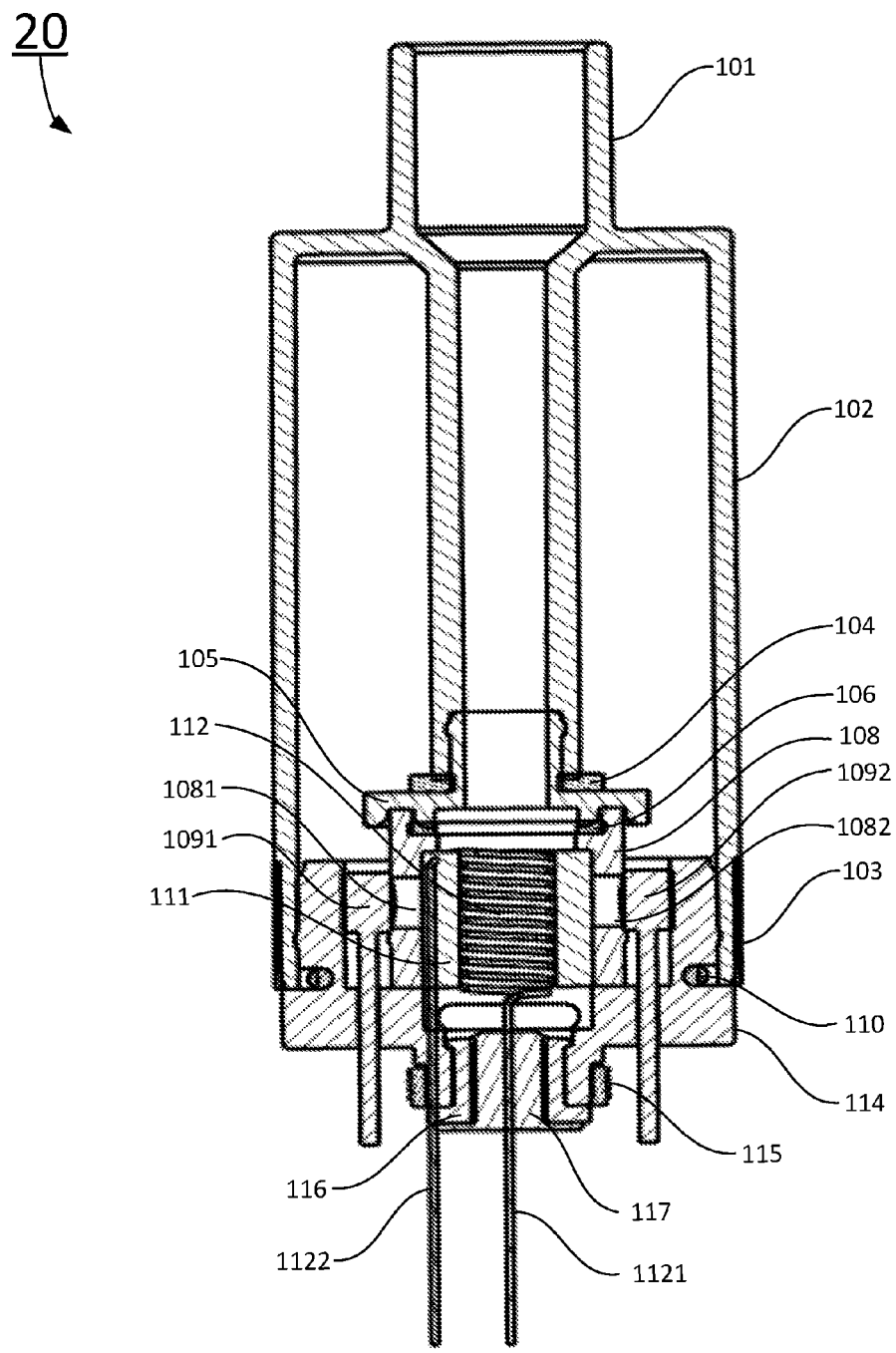
FIG. 4A is a detailed cross-sectional view of another electronic cigarette having the E-liquid separation mechanism when two separator blocks are in an upper position and E-liquid supply paths are blocked according to certain embodiments of the present disclosure.
Figure 4B:
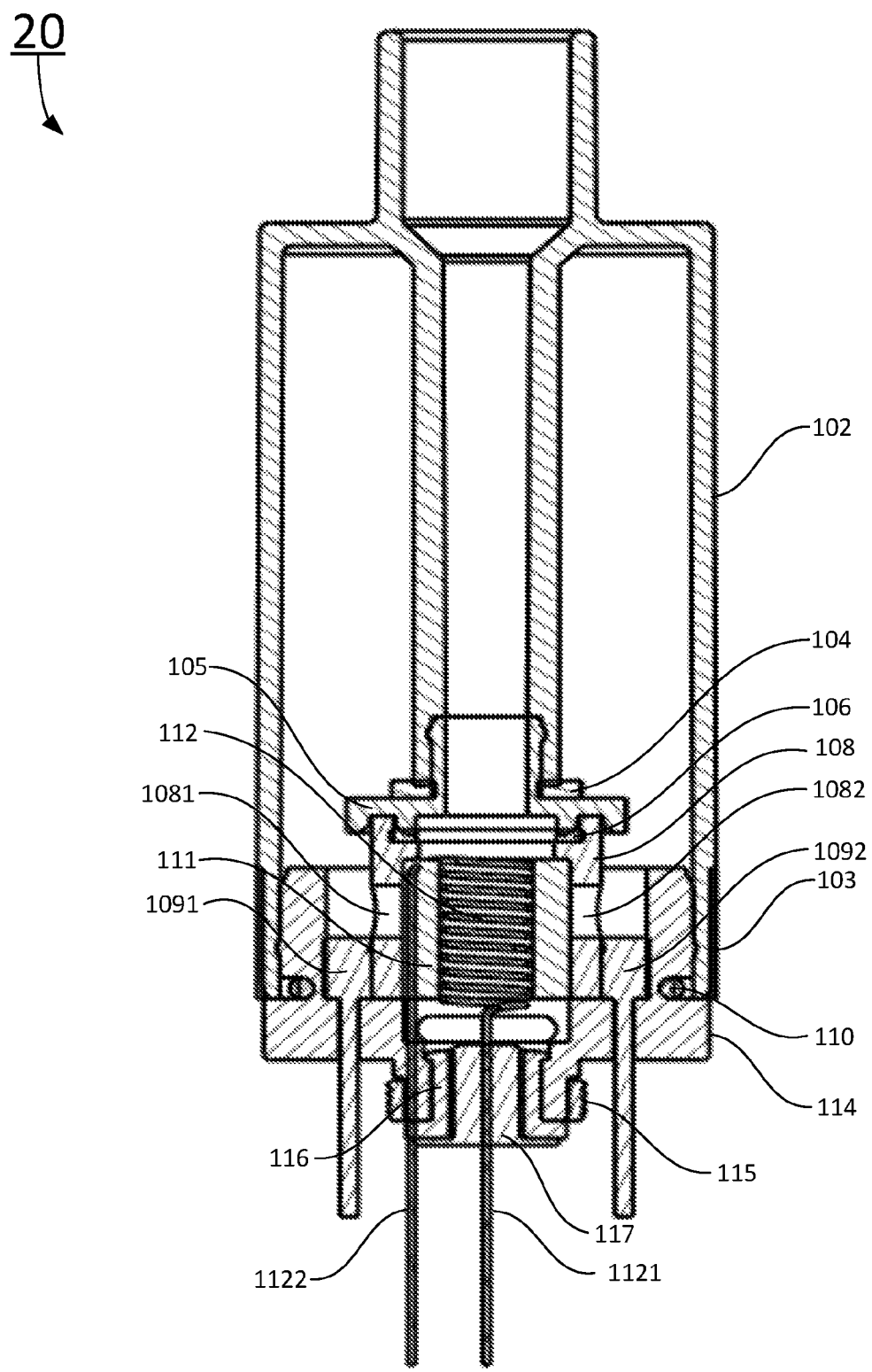
FIG. 4B is a detailed cross-sectional view of the electronic cigarette having the E-liquid separation mechanism when two separator blocks are pulled to a lower position and the E-liquid supply paths are opened according to certain embodiments of the present disclosure.

In another aspect, the present disclosure relates to another electronic cigarette 20 having another E-liquid separation mechanism, as shown in FIG. 2, FIG. 4A, and FIG. 4B.

In certain embodiments, the electronic cigarette 20 includes: an electronic cigarette body 150, a vaporizer 120, and an E-liquid separation mechanism 130.

The electronic cigarette body 150 may include an E-liquid storage tank 102, a mouthpiece 101 positioned on a top end of the E-liquid storage tank 102, and a vaporizer base 114 positioned at a bottom end of the E-liquid storage tank 102.

The vaporizer 120 is positioned on the vaporizer base 114. The vaporizer 120 includes a heating element 112, and a cylindrical E-liquid medium 111.

The E-liquid separation mechanism 130 includes a connecting base 108 defining a first connecting base E-liquid opening 1081, and an opposite second connecting base E-liquid opening 1082, a first separator block 2091, and a second separator block 2092.

In certain embodiments, when the first separator block 2091 is in a lower position as shown in FIG. 4B, a first E-liquid supply path is formed to supply E-liquid from the E-liquid storage tank 102 to the cylindrical E-liquid medium 111 through the first connecting base E-liquid opening 1081. When the second separator block 2092 is in a lower position as shown in FIG. 4B, a second E-liquid supply path is formed to supply E-liquid from the E-liquid storage tank 102 to the cylindrical E-liquid medium 111 through the second connecting base E-liquid opening 1082. When the first separator block 2091 is in an upper position as shown in FIG. 4A, the first E-liquid supply path is blocked. When the second separator block 2092 is in an upper position as shown in FIG. 4A, the second E-liquid supply path is blocked. The first separator block 2091 and the second separator block 2092 may be operated separately and independently to adjust the E-liquid vapor generated for the user.

The present disclosure also relates to a method of using the electronic cigarette 20. In certain embodiments, the method includes: pulling down, by a user, the first separator block 2091 to supply the E-liquid from the E-liquid storage tank 102 to the cylindrical E-liquid medium 111 through the first E-liquid supply path, and connecting the positive terminal and the negative terminal of the electrical power supply to the electronic cigarette 10 to enjoy electronic cigarette smoking.

In certain embodiments, when the user desires to increase an amount of E-liquid vapor, the user may pull down the second separator block 2092 to double the E-liquid supply from the E-liquid storage tank 102 to the cylindrical E-liquid medium 111 through the second E-liquid supply path to double the amount of E-liquid supply to the vaporizer 120.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to activate others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims, the foregoing description and the exemplary embodiments described therein, and accompanying drawings.

What is claimed is:

1. An electronic cigarette, comprising:
    an electronic cigarette body having an E-liquid storage tank, a mouthpiece positioned on a top end of the E-liquid storage tank, and a vaporizer base positioned at a bottom end of the E-liquid storage tank;
    a vaporizer positioned on the vaporizer base, wherein the vaporizer comprises a heating element, and a cylindrical E-liquid medium; and
    an E-liquid separation mechanism having a connecting base defining a first connecting base E-liquid opening, and an opposite second connecting base E-liquid opening, a separator base defining a first separator base E-liquid opening, and an opposite second separator base E-liquid opening, a first separator panel, and a second separator panel,
    wherein the first connecting base E-liquid opening coincides with the first separator base E-liquid opening forming a first E-liquid supply path from the E-liquid storage tank to the cylindrical E-liquid medium, the second connecting base E-liquid opening coincides with the second separator base E-liquid opening forming a second E-liquid supply path from the E-liquid storage tank to the cylindrical E-liquid medium, the first separator panel is positioned between the first connecting base E-liquid opening and the first separator base E-liquid opening, and the second separator panel is positioned between the second connecting base E-liquid opening and the second separator base E-liquid opening, and wherein when the first separator panel is in an upper position, the first E-liquid supply path is blocked, when the second separator panel is in an upper position, the second E-liquid supply path is blocked, when the first separator panel is in lower position, the first E-liquid supply path is opened, and when the second separator panel is in a lower position, the second E-liquid supply path is opened.

2. The electronic cigarette of claim 1, wherein the cylindrical E-liquid medium is installed outside of the heating element, wherein the cylindrical E-liquid medium comprises:
    cotton fibers;
    polypropylene fibers;
    terylene fibers;
    nylon fibers; and
    porous ceramic materials.

3. The electronic cigarette of claim 1, wherein the heating element comprises a positive terminal electrically coupled to a positive terminal of an electrical power supply through a positive terminal on the vaporizer base, and a negative terminal electrically coupled to a negative terminal of the electrical power supply through a negative terminal on the vaporizer base.

4. The electronic cigarette of claim 1, wherein the heating element comprises:
   a grid shaped heating element;
   a mesh shaped heating element;
   a net shaped heating element;
   a spiral heating element; and
   any combination thereof.

5. The electronic cigarette of claim 1, wherein the E-liquid storage tank is formed between an outside cylinder and an inside cylinder and configured to store E-liquid and supply E-liquid to the vaporizer.

6. The electronic cigarette of claim 5, wherein the inside cylinder forms an outlet for E-liquid vapor from the vaporizer to the mouthpiece.

7. The electronic cigarette of claim 6, wherein the vaporizer base comprises one or more vaporizer air intakes configured to allow outside air to enter the vaporizer to generate the E-liquid vapor.

8. The electronic cigarette of claim 7, wherein the one or more vaporizer air intakes, a space inside the vaporizer, and the inside cylinder of the E-liquid storage tank form an air flow path for the electronic cigarette.

9. The electronic cigarette of claim 1, wherein the vaporizer is positioned between a vaporizer cover and the vaporizer base, and a cylindrical wall of the vaporizer base and the vaporizer forms a path for the E-liquid in the E-liquid storage tank to enter the first E-liquid supply path and the second E-liquid supply path and to supply the E-liquid to the cylindrical E-liquid medium to be vaporized by the heating element.

10. A method of using the electronic cigarette of claim 1, comprising:
   pulling down the first separator panel to supply the E-liquid from the E-liquid storage tank to the cylindrical E-liquid medium through the first E-liquid supply path;
   connecting the positive terminal and the negative terminal of the electrical power supply to the electronic cigarette to enjoy electronic cigarette smoking; and
   pulling down the second separator panel to double the E-liquid supply from the E-liquid storage tank to the cylindrical E-liquid medium through the second E-liquid supply path to double the amount of E-liquid supply to the vaporizer, when a user desires to increase an amount of E-liquid vapor.

11. An electronic cigarette, comprising:
   an electronic cigarette body having an E-liquid storage tank, a mouthpiece positioned on a top end of the E-liquid storage tank, and a vaporizer base positioned at a bottom end of the E-liquid storage tank;
   a vaporizer positioned on the vaporizer base, wherein the vaporizer comprises a heating element, and a cylindrical E-liquid medium; and
   an E-liquid separation mechanism having a connecting base defining a first connecting base E-liquid opening, and an opposite second connecting base E-liquid opening, a first separator block, and a second separator block,
   wherein when the first separator block is in a lower position, a first E-liquid supply path is formed to supply E-liquid from the E-liquid storage tank to the cylindrical E-liquid medium through the first connecting base E-liquid opening, when the second separator block is in a lower position, a second E-liquid supply path is formed to supply E-liquid from the E-liquid storage tank to the cylindrical E-liquid medium through the second connecting base E-liquid opening, when the first separator block is in an upper position, the first E-liquid supply path is blocked, and when the second separator block is in an upper position, the second E-liquid supply path is blocked.

12. The electronic cigarette of claim 11, wherein the cylindrical E-liquid medium is installed outside of the heating element, wherein the cylindrical E-liquid medium comprises:
   cotton fibers;
   polypropylene fibers;
   terylene fibers;
   nylon fibers; and
   porous ceramic materials.

13. The electronic cigarette of claim 11, wherein the heating element comprises a positive terminal electrically coupled to a positive terminal of an electrical power supply through a positive terminal on the vaporizer base, and a negative terminal electrically coupled to a negative terminal of the electrical power supply through a negative terminal on the vaporizer base.

14. The electronic cigarette of claim 11, wherein the heating element comprises:
   a grid shaped heating element;
   a mesh shaped heating element;
   a net shaped heating element;
   a spiral heating element; and
   any combination thereof.

15. The electronic cigarette of claim 11, wherein the E-liquid storage tank is formed between an outside cylinder and an inside cylinder and configured to store E-liquid and supply E-liquid to the vaporizer.

16. The electronic cigarette of claim 15, wherein the inside cylinder forms an outlet for E-liquid vapor from the vaporizer to the mouthpiece.

17. The electronic cigarette of claim 16, wherein the vaporizer base comprises one or more vaporizer air intakes configured to allow outside air to enter the vaporizer to generate the E-liquid vapor.

18. The electronic cigarette of claim 17, wherein the one or more vaporizer air intakes, a space inside the vaporizer, and the inside cylinder of the E-liquid storage tank form an air flow path for the electronic cigarette.

19. The electronic cigarette of claim 11, wherein the vaporizer is positioned between a vaporizer cover and the vaporizer base, and a cylindrical wall of the vaporizer base and the vaporizer forms a path for the E-liquid in the E-liquid storage tank to enter the first E-liquid supply path and the second E-liquid supply path and to supply the E-liquid to the cylindrical E-liquid medium to be vaporized by the heating element.

20. A method of using the electronic cigarette of claim 11, comprising:
   pulling down the first separator block to supply the E-liquid from the E-liquid storage tank to the cylindrical E-liquid medium through the first E-liquid supply path;
   connecting the positive terminal and the negative terminal of the electrical power supply to the electronic cigarette to enjoy electronic cigarette smoking; and pulling down the second separator block to double the E-liquid supply from the E-liquid storage tank to the cylindrical E-liquid medium through the second E-liquid supply path to double the amount of E-liquid supply to the vaporizer, when a user desires to increase an amount of E-liquid vapor.

* * * * *